(12) United States Patent
Rangan

(10) Patent No.: US 6,422,706 B1
(45) Date of Patent: Jul. 23, 2002

(54) APPARATUS AND METHOD FOR POSITIONING A MIRROR IN A MOTOR VEHICLE TO ENSURE CORRECT COVERAGE OF A CRITICAL FIELD OF VIEW

(76) Inventor: Karur S. Rangan, 36 Aberfeldy Crescent, Thorn Hill, Ontario (CA), L3T 4C2

(*) Notice: Subject to any disclaimer, the term of this patent is extended or adjusted under 35 U.S.C. 154(b) by 0 days.

(21) Appl. No.: 09/574,385

(22) Filed: May 19, 2000

Related U.S. Application Data

(60) Provisional application No. 60/135,394, filed on May 21, 1999.

(51) Int. Cl.⁷ .............................. B60R 1/06; G02B 5/08
(52) U.S. Cl. ...................... 359/857; 359/838; 359/850; 359/872; 359/900; 33/264
(58) Field of Search ................................ 359/838, 857, 359/839, 831, 833, 843, 872, 850, 900; 356/139, 153, 254, 255; 33/264

(56) References Cited

U.S. PATENT DOCUMENTS

| | | | |
|---|---|---|---|
| 4,730,926 A | * 3/1988 | Wedemeyer | 359/838 |
| 5,122,910 A | * 6/1992 | Polanyi et al. | 359/865 |
| 5,237,458 A | * 8/1993 | Polanyi et al. | 359/839 |
| 5,500,773 A | * 3/1996 | Easter | 359/838 |
| 5,668,675 A | * 9/1997 | Fredricks | 359/838 |
| 5,993,015 A | * 11/1999 | Fredricks | 359/843 |
| 6,056,411 A | * 5/2000 | Blevins | 359/838 |

FOREIGN PATENT DOCUMENTS

| | | | | |
|---|---|---|---|---|
| DE | 3613556 A | * 10/1987 | | 359/838 |
| JP | 405229387 A | * 9/1993 | | 359/843 |

* cited by examiner

Primary Examiner—Cassandra Spyrou
Assistant Examiner—John Juba, Jr.

(57) ABSTRACT

A mirror assembly for ensuring correct coverage of a critical field of view. Reference points (e.g., markings, light sources, images of objects) are used for correct mirror adjustment. In one embodiment, dots are located on the center of the mirror and on a fixed inner and outer glass located immediately in front of the mirror. The viewer aligns the dots such that the dot on the mirror appears directly in front of mirror images of the dots on the outer an inner glass. In an alternative embodiment, a light source produces the reference points. The light is reflected by a back surface of the mirror coated in a concentric pattern of gradient coating material. The resulting reflection is a reflected spot corresponding to the center of the patterns, where a transparent center window is located, and a shaded area corresponding to the concentric pattern. The viewer tilts the mirror so that the reflected spot overlaps the shaded area in the line of sight. The mirror could be a rear view or side-view mirror. In another embodiment where the assembly is mounted to the side, the alignment spots are reflected by a right angled prism or mirror. The viewer aligns the reflected spots and thus positions the mirror correctly.

10 Claims, 19 Drawing Sheets

Illustration of the mirror assembly of Fig. 17 properly aligned

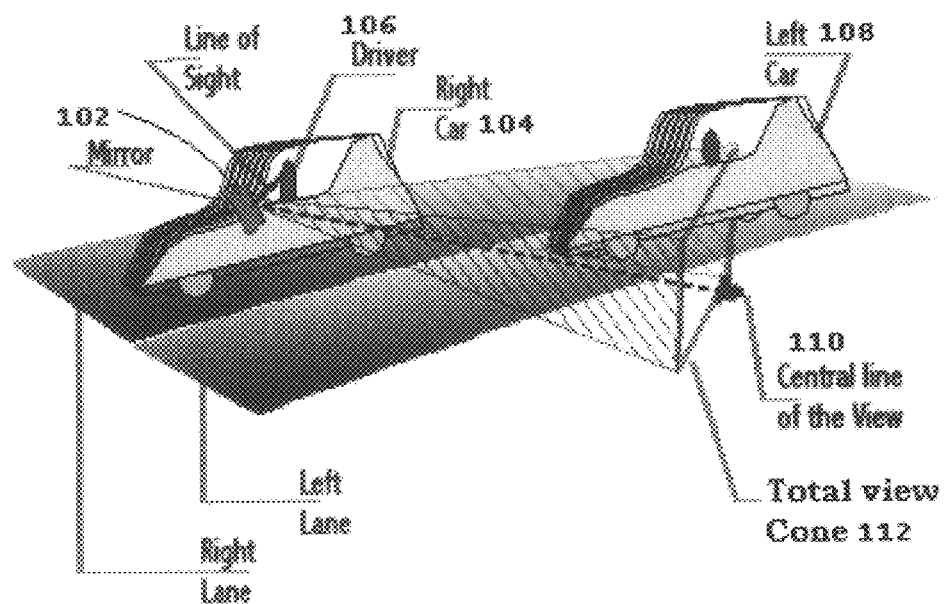
Fig. 1: Diagram of the geometry of a side-view mirror and cars on a road Fig. 2: Diagram defining a total view
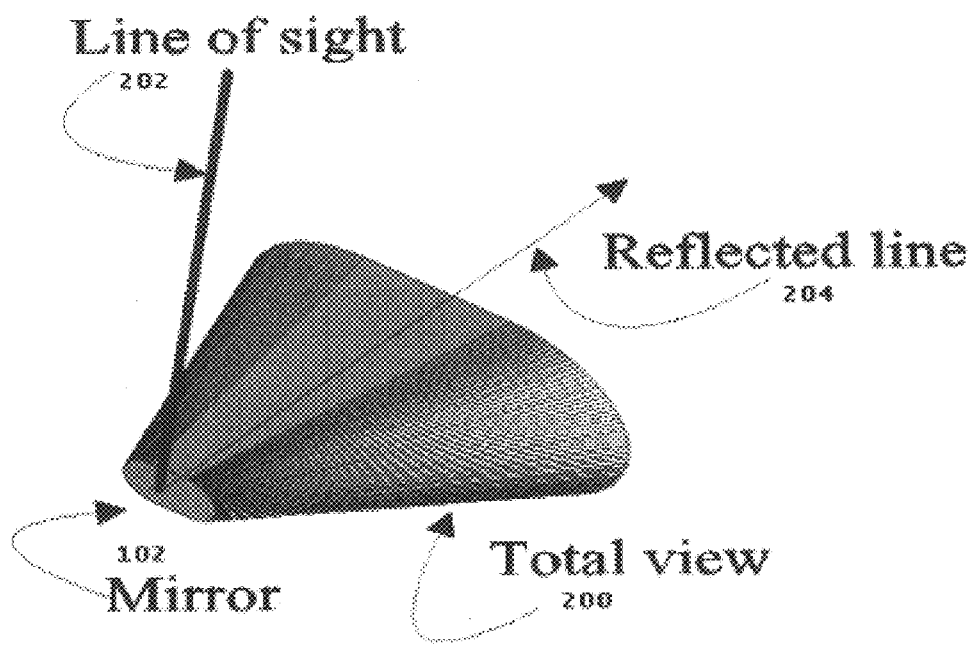

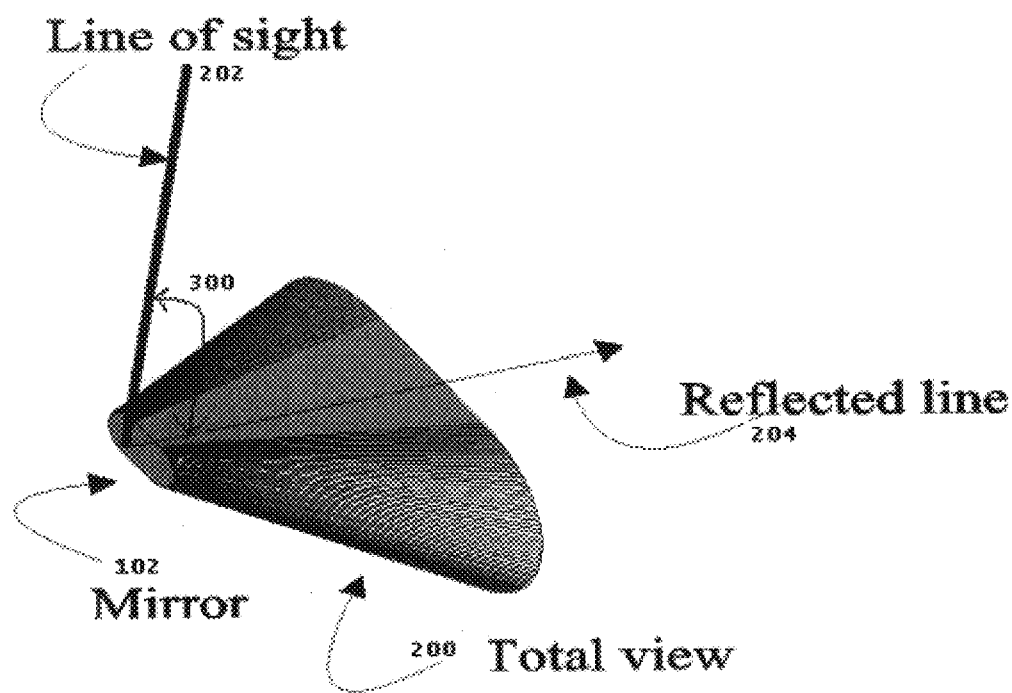
Fig. 3: Illustrates a change in the total view of Fig. 2

Fig. 4: Diagram defining a central line of view
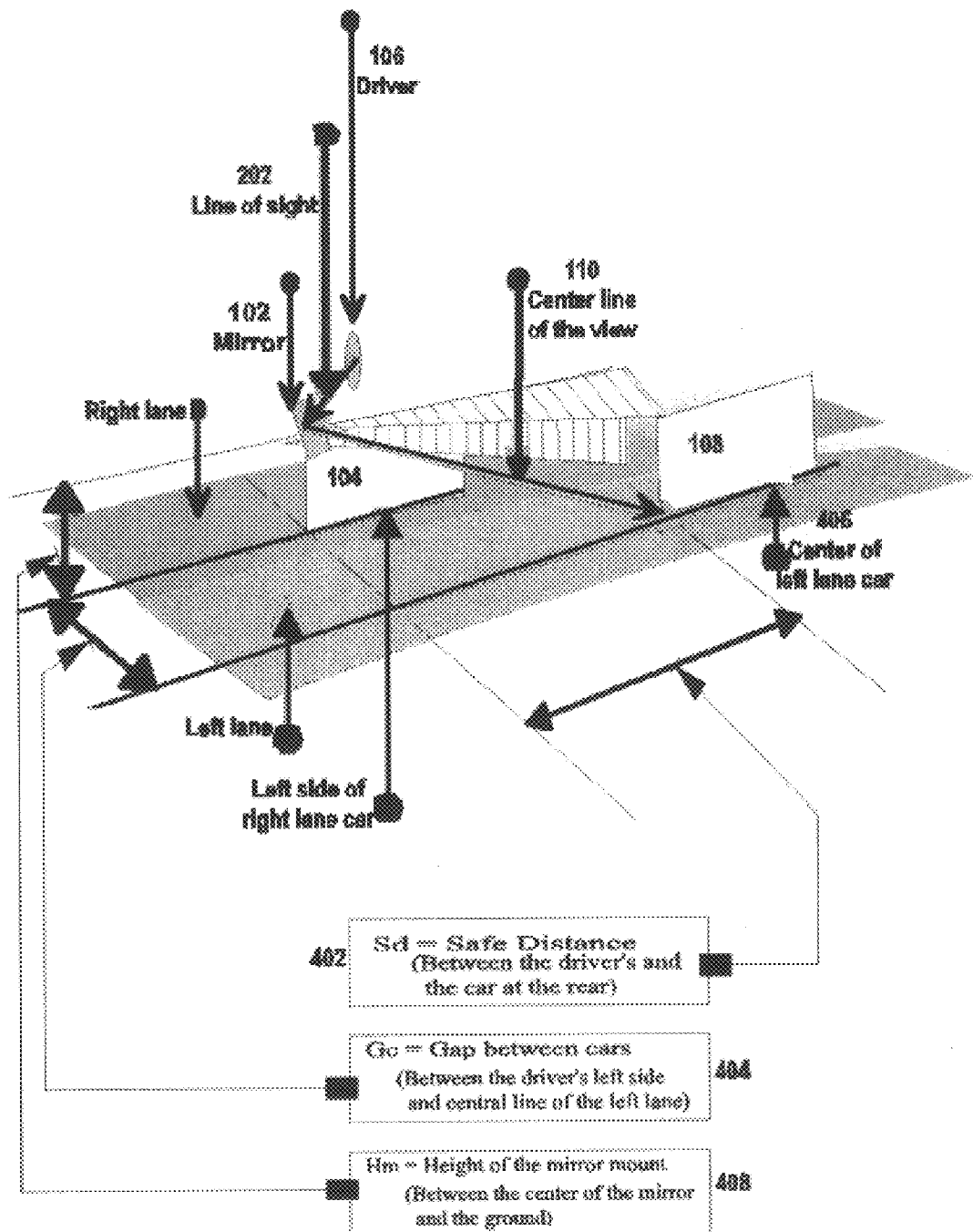

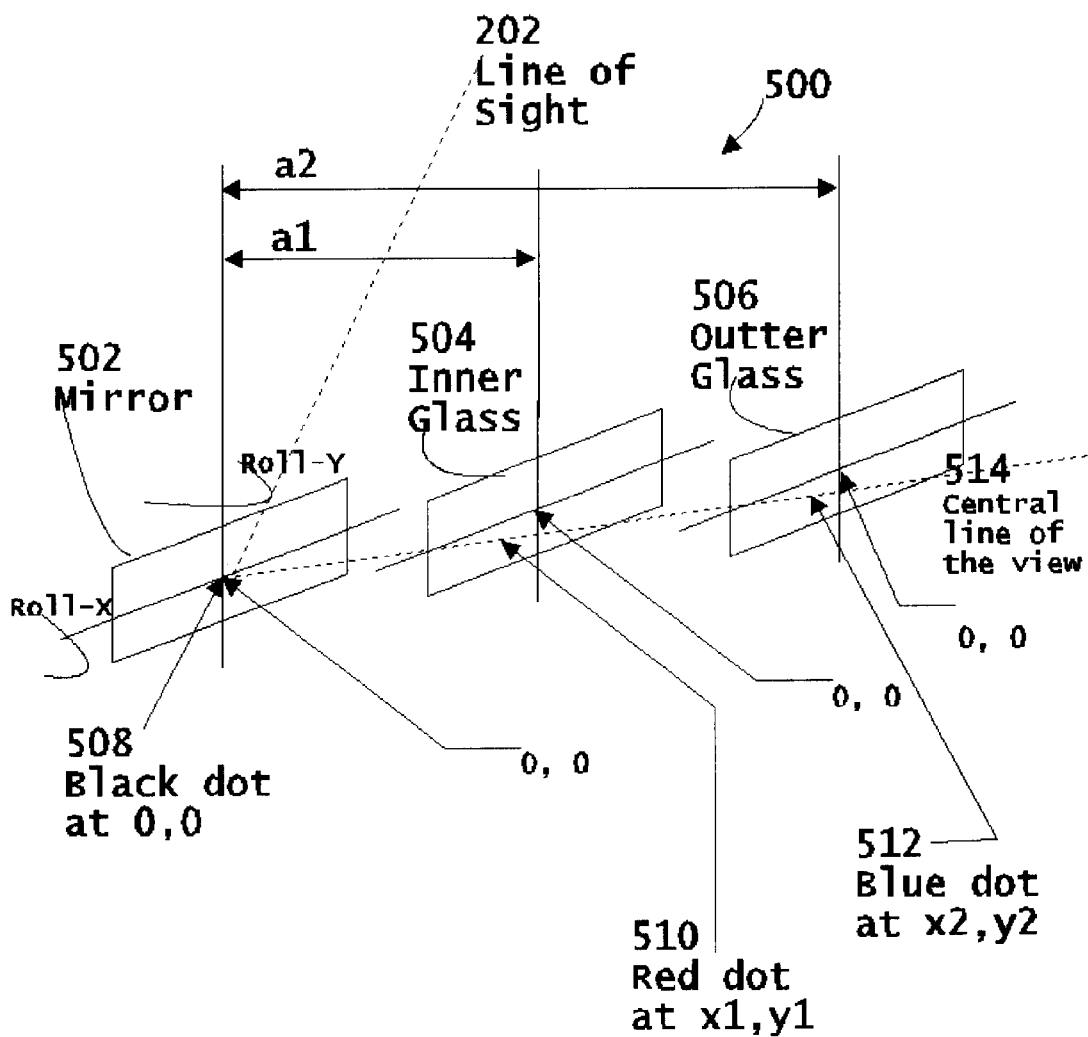
Fig. 5: Exploded perspective view of a mirror assembly for ensuring correct viewing coverage according to the present invention Fig. 6: Illustration of the assembly of Fig. 5 not properly adjusted
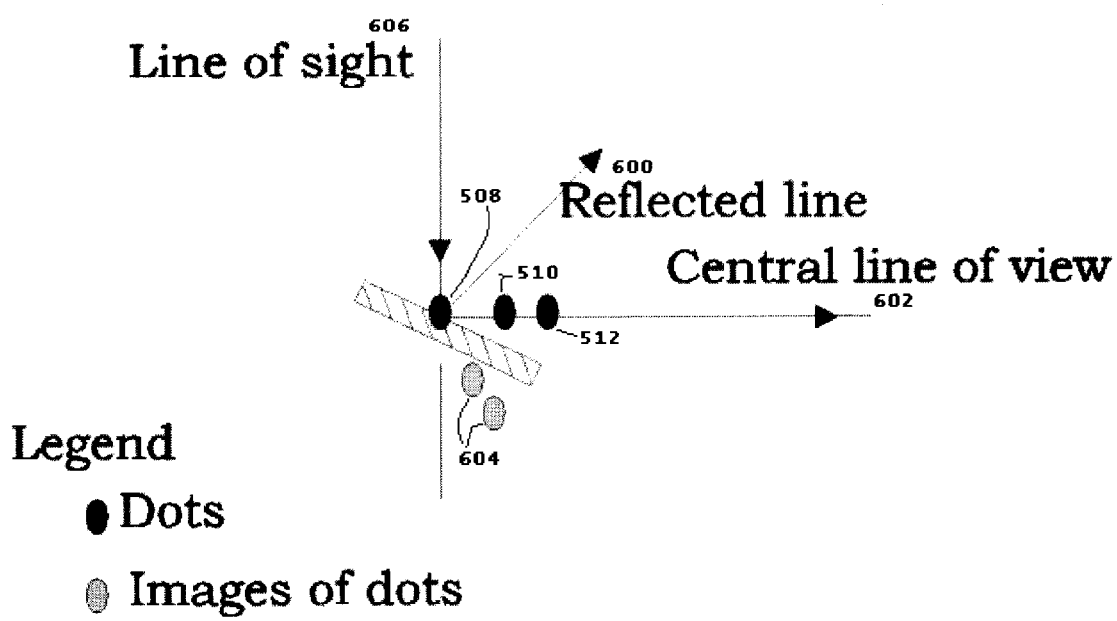

Fig. 7 Illustration of the assembly of Fig. 5 properly adjusted
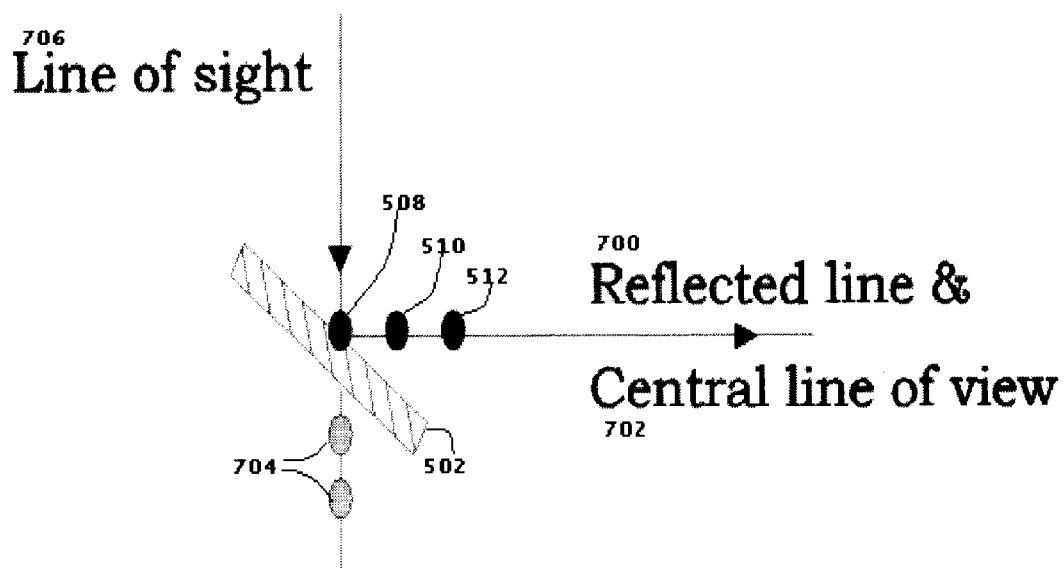

Fig. 8: Diagram of an alternative assembly showing the view with both eyes for ensuring correct viewing coverage
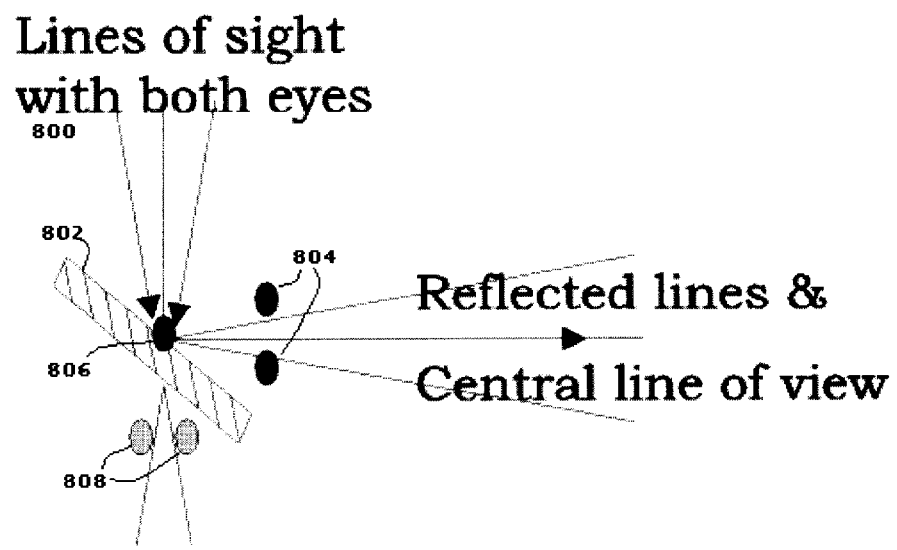

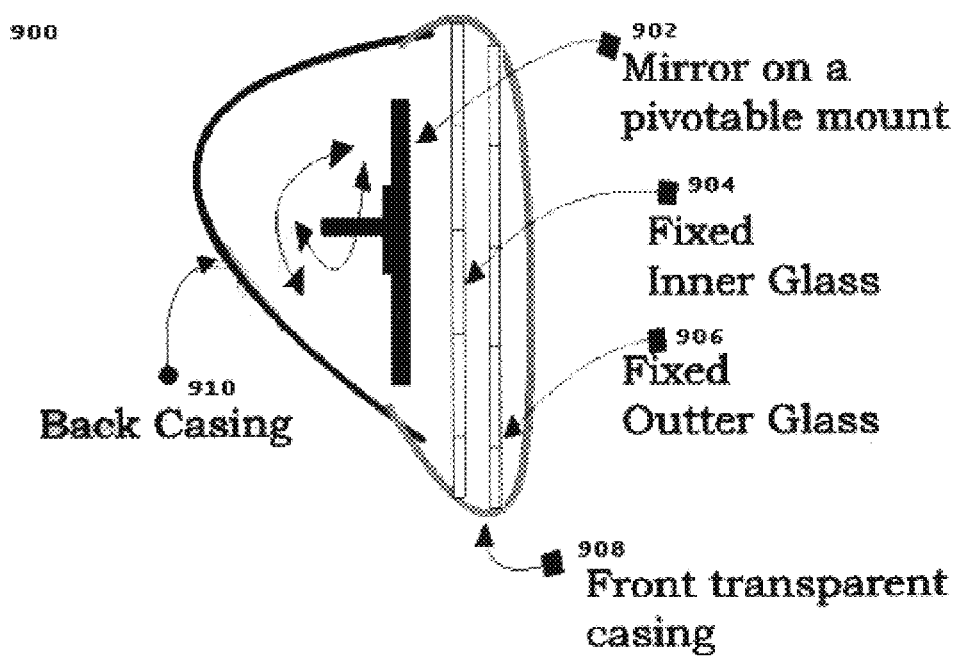
Fig. 9: Top view of a mirror assembly according to the present invention

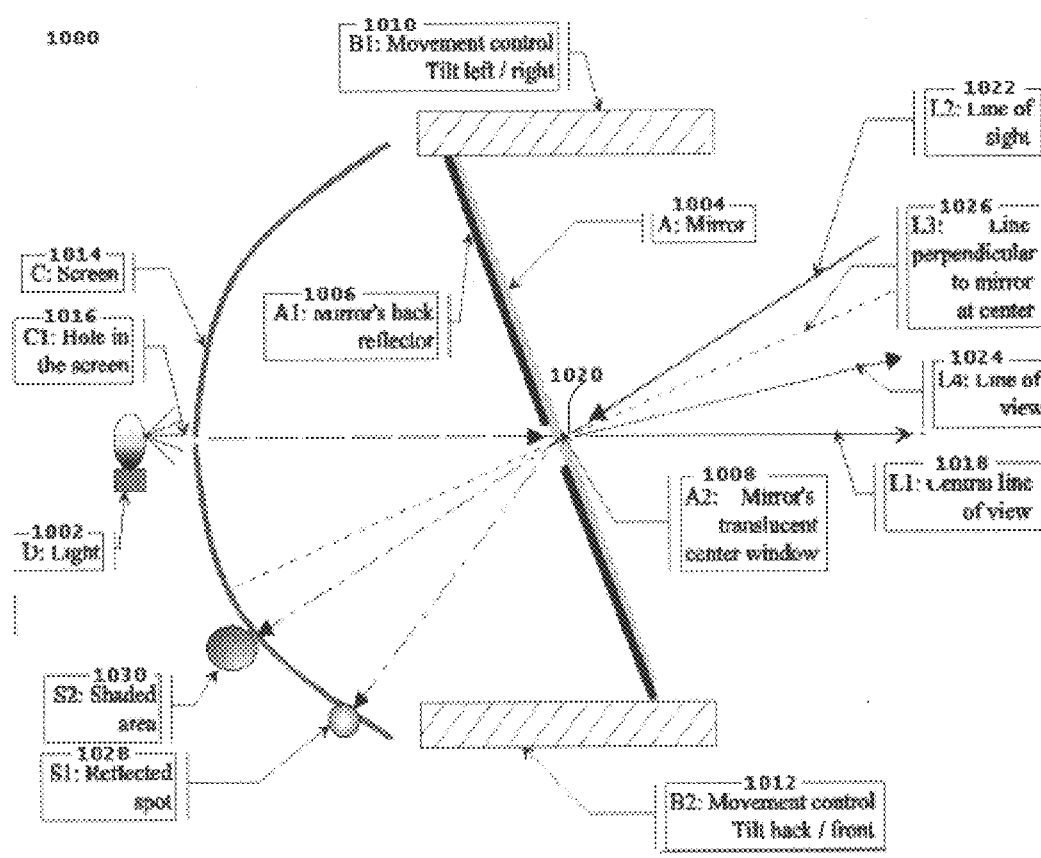
Fig. 10: Top view of an alternate mirror assembly according to the invention

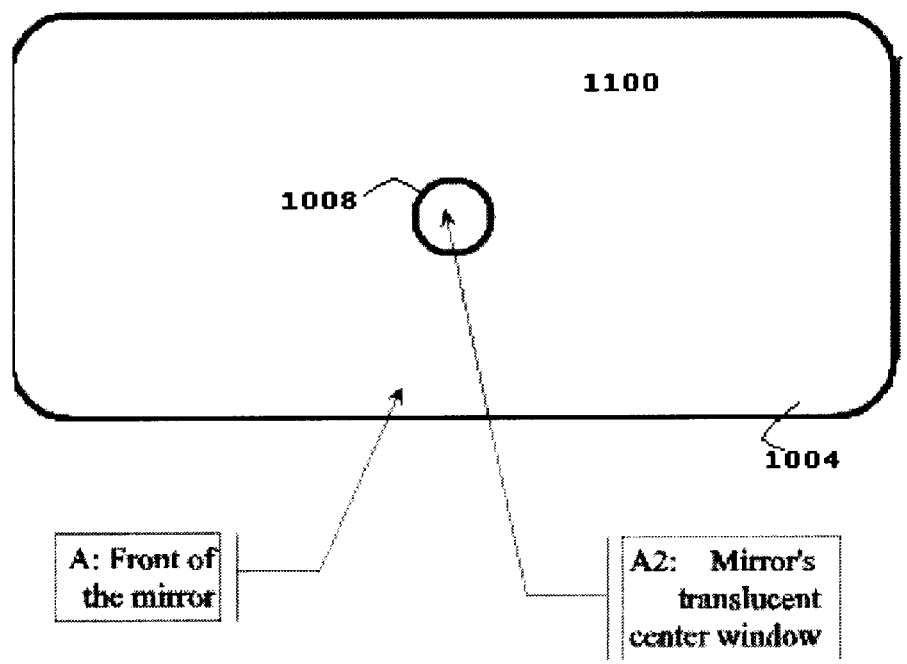
Fig. 11: Front view of the mirror of assembly of Fig. 10

Fig. 12: Back view of the mirror assembly of Fig. 10
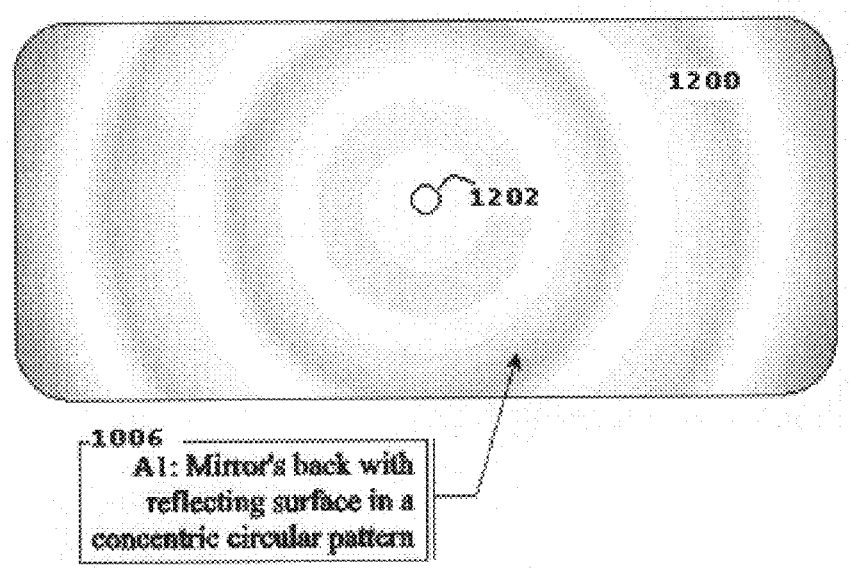

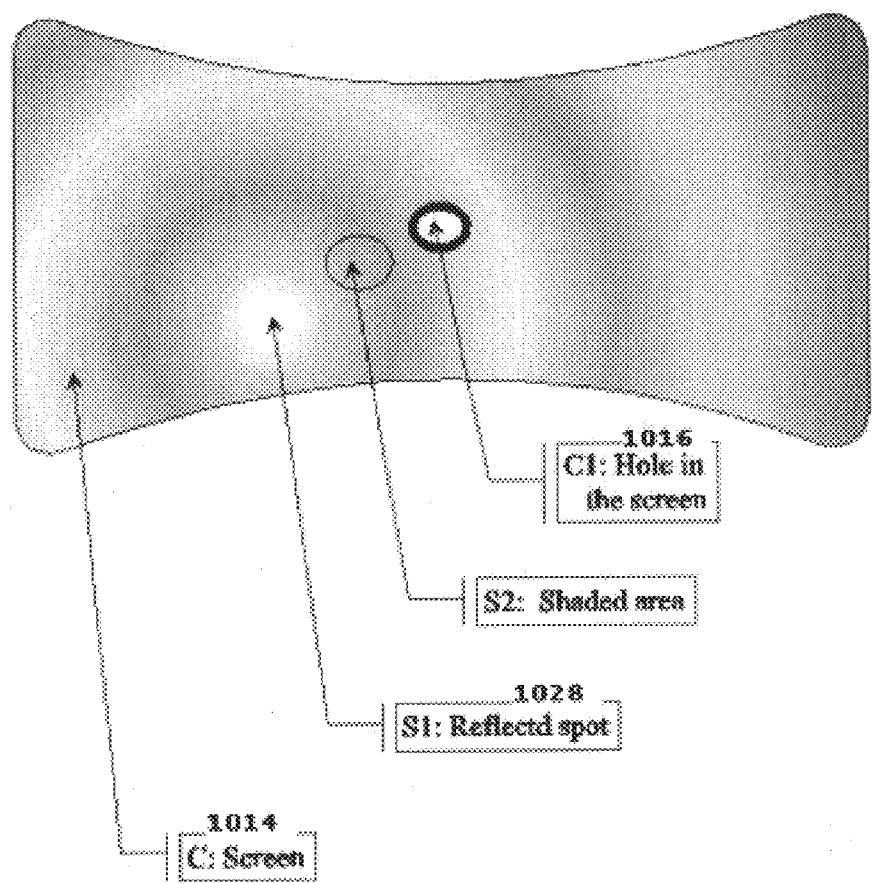
Fig. 13: Front view of the screen assembly of Fig. 10

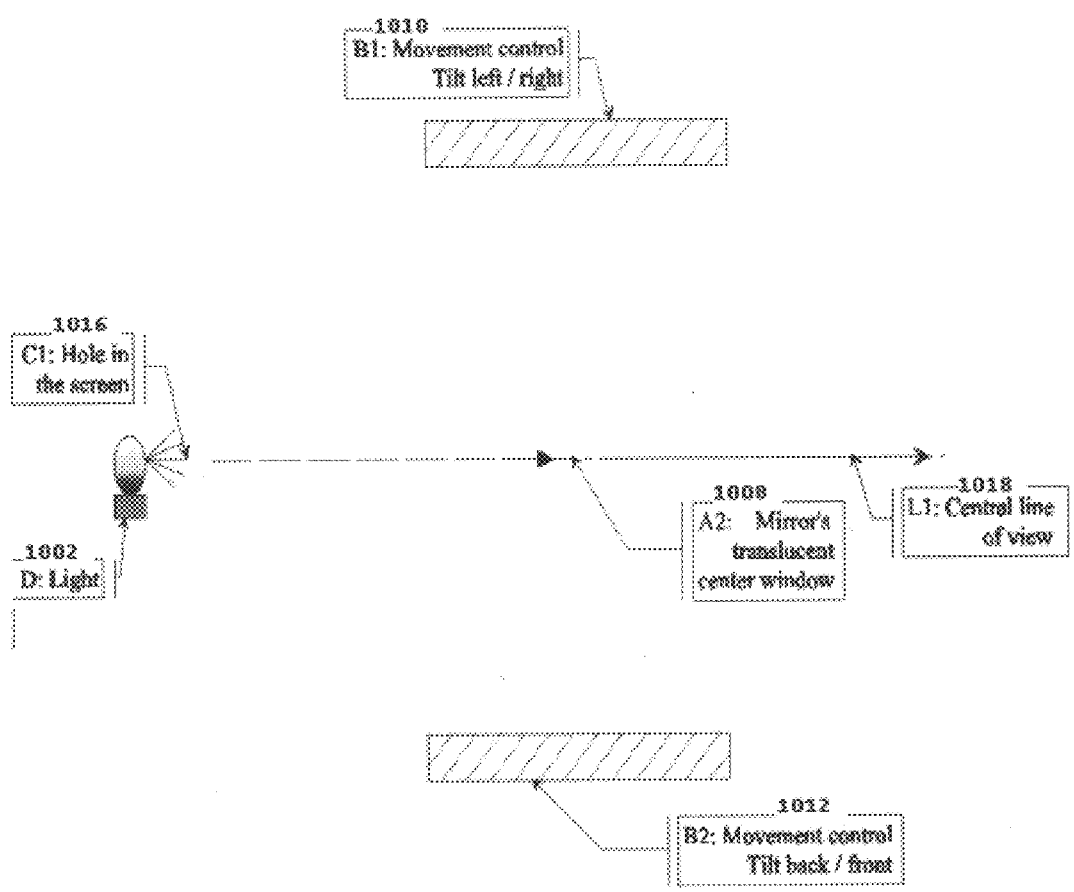
Fig. 14: Top illustration of the assembly of Fig. 10 defining a central line of view

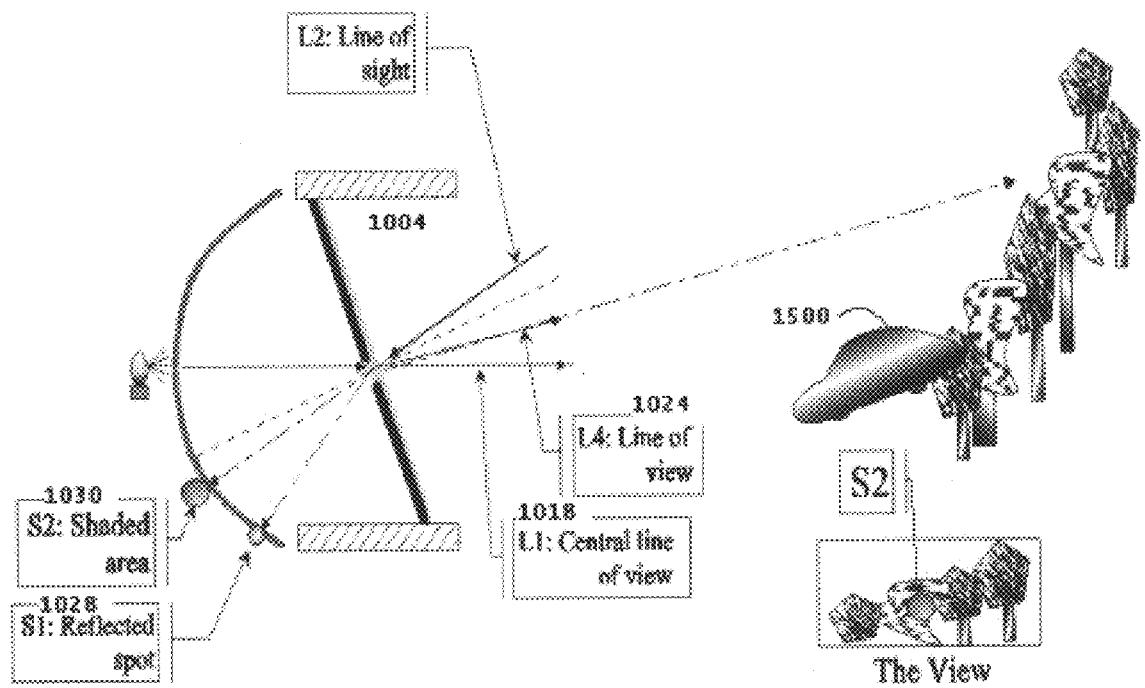
Fig. 15: Illustration of the mirror assembly of Fig. 10 misaligned

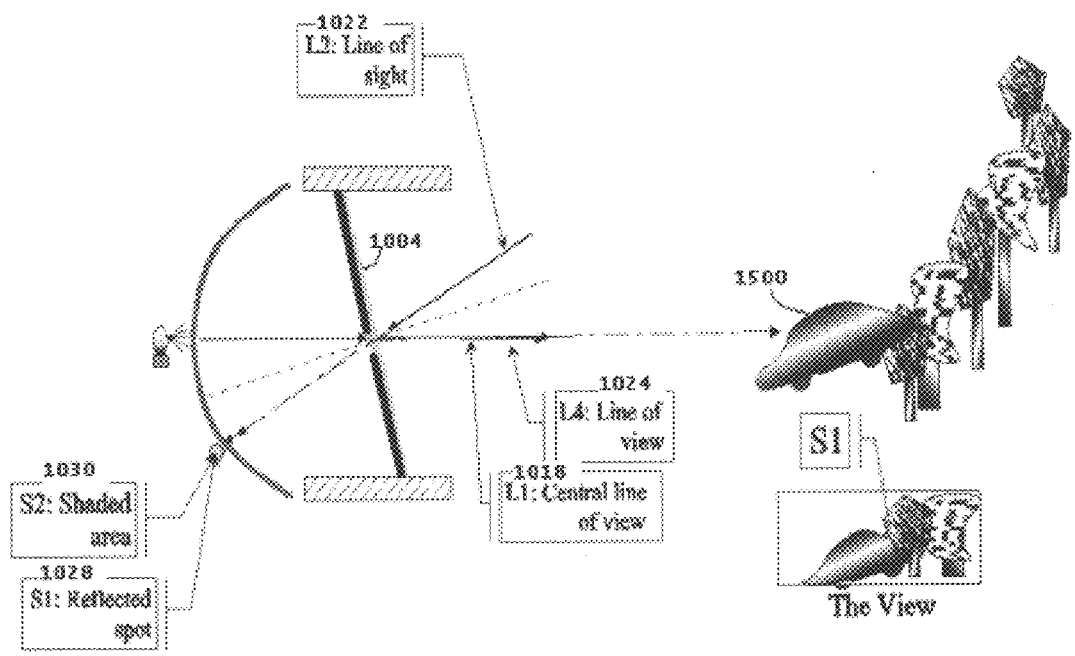
Fig. 16: Illustration of the mirror assembly of Fig. 10 properly aligned

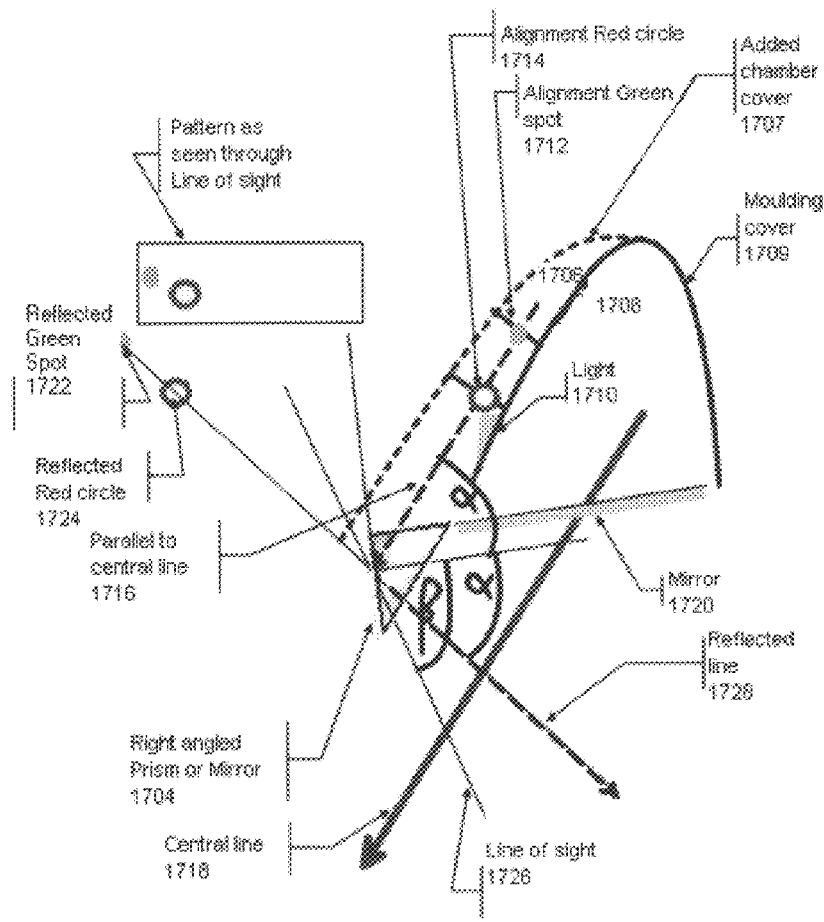
Fig. 17: Illustration of another embodiment of a mirror assembly misaligned in a first configuration

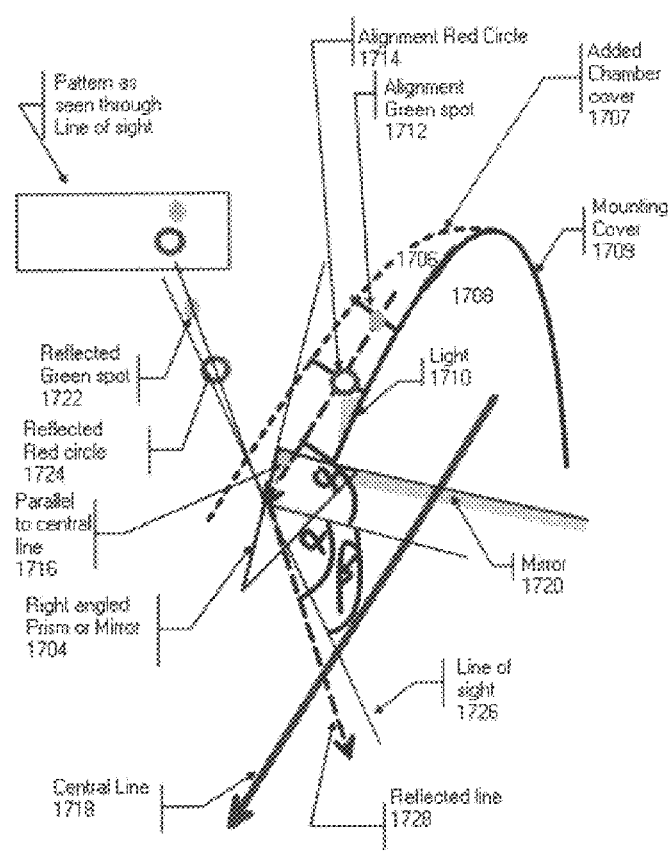
Fig. 18: Illustration of the mirror assembly of Fig. 17 misaligned in a second configuration

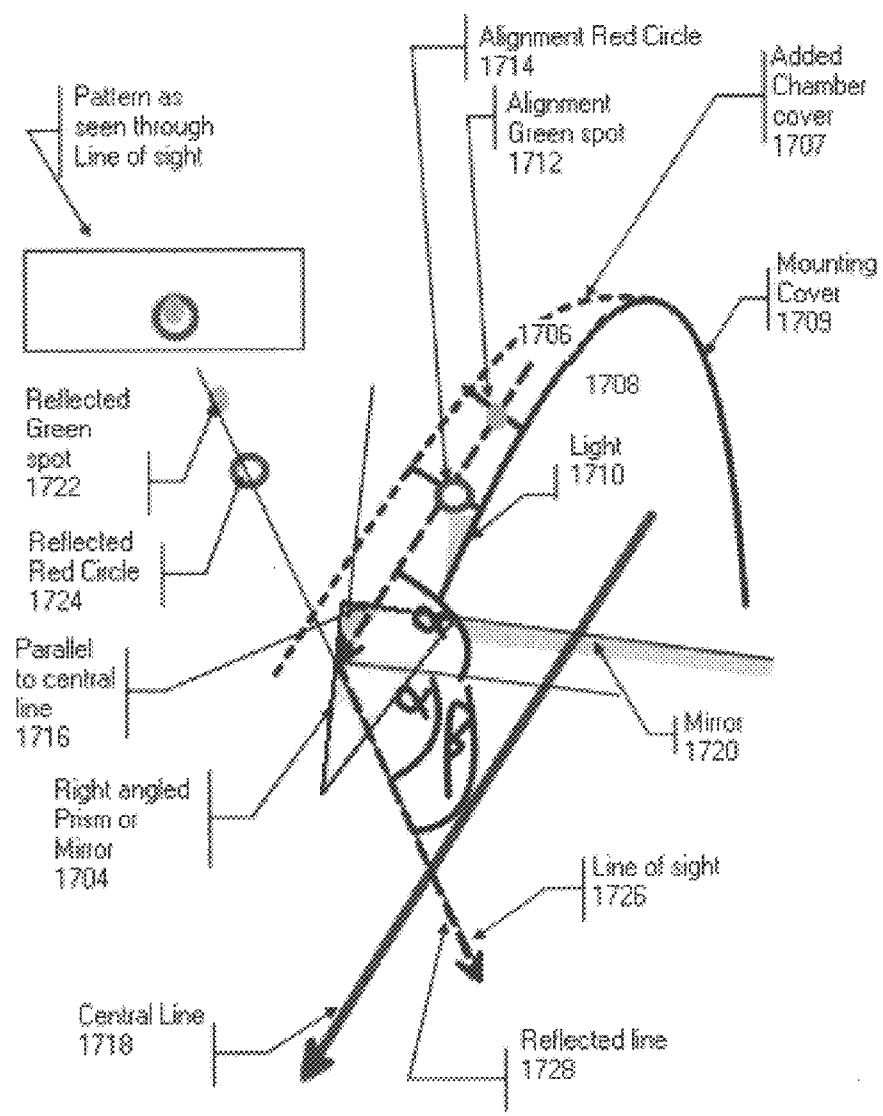
Fig. 19: Illustration of the mirror assembly of Fig. 17 properly aligned

APPARATUS AND METHOD FOR POSITIONING A MIRROR IN A MOTOR VEHICLE TO ENSURE CORRECT COVERAGE OF A CRITICAL FIELD OF VIEW

CROSS-REFERENCE TO RELATED APPLICATION

This application claims the benefit of Provisional Patent Application Serial No. 60/135,394, entitled "Apparatus for Ensuring Correct Coverage of the Critical Field of Vision," filed on May 21, 1999. The subject matter of the related application is herein incorporated by reference.

BACKGROUND OF THE INVENTION

1. Field of the Invention

This invention relates generally to mirrors and more particularly to an apparatus for ensuring correct coverage of a critical field of view in automobile rear-view and side-view mirrors.

2. Description of the Background Art

Having an unobstructed field of view is essential for drivers of motor vehicles, and for this reason automobiles and trucks are equipped with a number of mirrors. Typically, a rectangular mirror is mounted inside the center of the windshield to provide a view to the rear of the vehicle. Mirrors are also mounted on each side of vehicles for additional perspectives.

It is often difficult for a driver to judge whether the rear-view mirrors are properly adjusted to provide an adequate view. If a driver needs to adjust a mirror while moving along a curved road, the changing orientation of the car relative to the road behind the vehicle makes it difficult for the driver to aim the mirror correctly. Even when the vehicle is on a straight road, many drivers do not know how to adjust the mirror. Moving or stationary vehicles that must be seen by the driver of the car for safety reasons may not be visible to the driver when looking through the mirror. The field of view that determines the safe zone is termed as the critical field of view. An improperly adjusted mirror may leave the viewer a "blind spot" in which the viewer cannot see the entire critical field of view.

The uncertainty in mirror adjustment is due to several factors. Firstly, there is no easily identifiable target against which to adjust the mirror. In a dynamic environment, any selected reference object is in motion relative to the vehicle. Secondly, the seated position of the person who adjusts the mirror may be different from the position of the person who uses the adjusted mirror. Finally, the field of view changes with changes in the seated position of the viewer.

Current mirror adjustment methods presume the viewer is in a simple and stable environment and make little or no provision for a real and dynamic environment. Therefore, there is a need for an apparatus that will assist individuals and machines to correctly adjust a mirror to ensure the correct coverage of the critical field of view.

SUMMARY OF THE INVENTION

The present invention ensures correct coverage of a critical field of view by providing a mirror or other optical assembly with reference points that a viewer can utilize to correctly adjust the direction of the mirror. The invention places at least two reference points such that when they appear to a user to be in their designated positions with respect to one another, the optical device is properly aligned. Typically, their designated positions are where one reference mark appears to be directly behind the other, along the user's line of sight. The reference points could be markings, light sources, or translucent, opaque or reflective objects, for example. The reference points may also be the image of two or more objects such as markings rather than the objects themselves.

In one embodiment, the reference points are dots located on the center of a mirror and on a fixed inner glass and a fixed outer glass located immediately in front of the mirror. Aligning the dot on the mirror until it is directly behind the dots on the inner and outer glass (or coincident with images of the inner and outer glass dots in the mirror), obtains the correct coverage of the critical field of view.

In an alternative embodiment, a light source produces the reference points. The light is reflected by a back surface of the mirror coated with material in a concentric gradient pattern. The resulting reflection is a reflected spot corresponding to the center of the pattern and a shaded area corresponding to the concentric portion of the pattern. A viewer looking along a line of sight sees the shaded area. When the mirror is tilted such that the reflected spot overlaps the shaded area, the mirror is properly adjusted.

In another embodiment, the reference points are two translucent bodies arranged along a line parallel to a line that determines the preferred orientation of the mirror. The image of the two translucent bodies is reflected so that when they both appear to be aligned with the user's line of sight the mirror is properly aligned. Preferably, the two translucent bodies are illuminated using a light placed behind or in front of them.

BRIEF DESCRIPTION OF THE DRAWINGS

FIG. 1 is diagram of the geometry of a side-view mirror and cars on a road;

FIG. 2 is diagram defining a total view;

FIG. 3 illustrates a change in the total view of FIG. 2;

FIG. 4 is a diagram defining a central line of view;

FIG. 5 an exploded perspective view of a mirror assembly for ensuring correct viewing coverage according to the present invention;

FIG. 6 is an illustration of the assembly of FIG. 5 not properly adjusted;

FIG. 7 is an illustration of the assembly of FIG. 5 properly adjusted;

FIG. 8 is a diagram of an alternative assembly showing the view with both eyes for ensuring correct viewing coverage;

FIG. 9 is a top view of a mirror assembly according to the present invention;

FIG. 10 is a top view of an alternative mirror assembly according to the invention;

FIG. 11 is a front view of the mirror of the assembly of FIG. 10;

FIG. 12 is a back view of the mirror of the assembly of FIG. 10;

FIG. 13 is a front view of the screen of the assembly of FIG. 10;

FIG. 14 is top illustration of the assembly of FIG. 10 defining a central line of view;

FIG. 15 is an illustration of the mirror assembly of FIG. 10 misaligned;

FIG. 16 is an illustration of the mirror assembly of FIG. 10 properly aligned;

FIG. 17 is an illustration of another embodiment of a mirror assembly misaligned in a first configuration;

FIG. 18 is an illustration of the mirror assembly of FIG. 17 misaligned in a second configuration; and FIG. 19. is an illustration of the mirror assembly of FIG. 17 properly aligned.

DETAILED DESCRIPTION OF THE PREFERRED EMBODIMENT

FIG. 1 shows the basic concepts of a mirror 102 of a first vehicle (right car) 104 with a driver 106 attempting to view a second vehicle (left car) 108. A line 110 from the center of the mirror 102 to a point which needs to be in view at all times is fixed relative to the position of the center of the mirror 102, and is depicted as the central line of the view 110. Mirror 102 is depicted as a side-view mirror but could also be a rear-view mirror.

An imaginary view cone 112, which defines abstract boundaries of a safe zone, contains the central line 110. The safe zone is characterized both by the driver's 106 visibility of, and the ability to judge the relative motions of the second vehicle 108, and by the non-visibility of vehicles outside of the cone 112. The outside vehicles must enter the view cone 112 to be considered dangerously close to the first vehicle 104.

The shape and direction of the view cone 112 are controlled to minimize a car's blind spot and optimize the viewable area. The cone 112 and the central line of view 110 positions are fixed relative to the center of the mirror 102 and do not change as the mirror 102 tilts around the central x or y-axis.

FIG. 2 is a diagram defining a total view 200. From the driver 106 (not shown in FIG. 2), a line of sight 202 extends to the center of the mirror 102. The reflection of the line of sight 202 defines a "reflected" line 204. The arrow on line 204 represents the direction of view, which is opposite to the direction light travels before being received by the eye of the driver 106 (in FIG. 1). Line 204 is a reflected line only in the sense that it is a would-be reflection of the line of sight 202 were the line of sight 202 an object. The light from objects such as car 108 (FIG. 1) travels along reflected line 204 in the direction opposite the arrow and is reflected along the line of sight 202 to the driver 106 (FIG. 1). All objects within the boundaries of the total view 200 become visible by looking along the line of sight 202 at the mirror 102. When the reflected line 204 coincides with the central line of view 110 (FIG. 1), the total view 200 coincides with the total view cone 112 (FIG. 1).

FIG. 3 illustrates a change in the total view 200 of FIG. 2. A shift in the seated position of the driver 106 will cause a change in the line of sight 202, and results in a change in angle 300 between the line of sight 202 and the mirror 102. This change in the angle 300 moves the reflected line 204 and causes a shift in the total view 200.

FIG. 4 is a diagram illustrating terms and measurements used in locating the central line of the view 110. As shown in FIG. 4, the difference in distance between the first vehicle 104 containing the driver 106 and the second vehicle 108 located to the left and behind the first vehicle 104 defines a safe distance (Sd) 402. A gap between cars (Gc) 404 is calculated based on the difference between the left side of the first vehicle 104 and a central line 406 of the second vehicle 108. Further, a height of the mirror mount (Hm) 408 is the distance between the center of the mirror 102 and the ground.

FIG. 5 is an exploded perspective view of a mirror assembly 500 for ensuring correct viewing coverage. The assembly 500 contains a mirror 502, an inner glass 504, and an outer glass 506. Reference points are centered on the mirror 502 and each of the glasses 504 and 506—a black dot 508 located at coordinate 0,0 on the mirror 502; a red dot 510 located at coordinate x1, y1 on the inner glass 504; and a blue dot located at coordinate x2, y2 on the outer glass 506. Alternatively, the colors of the dots may vary.

Two reference points on two transparent surfaces interposed between the center of the mirror 502 and a point of focus mark a central line of view 514. Thus, the central line 514 will connect the dot 508 of the mirror 502, the dot 510 of the inner glass 504, and the dot 512 of the outer glass 506.

As shown in FIG. 5, a1 defines the distance between the mirror 502 and the inner glass 504, while a2 defines the distance between the mirror 502 and the outer glass 506. By comparing FIG. 4 and FIG. 5, the following equations are derived:

$x1 = a1 * Gc/Sd$ $y1 = a1 * Hm/Sd$ $x2 = a2 * Gc/Sd$ $y2 = a2 * Hm/Sd$.

FIG. 6 is an illustration of the assembly 500 of FIG. 5 out of adjustment. If a reflected line and a central line of view 602 do not coincide, images of dots 604 (as seen in the mirror 502) appear separate when viewed along a line of sight 606.

However, the mirror 502 can be adjusted so that a reflected line 700 coincides with a central line of view 702 (see FIG. 7) resulting in the dot 508 (see also FIG. 5) overlapping images of dots 704. When this occurs, a viewer only sees the dot 508 on the mirror 502 because the images of dots 704 are hidden behind the dot 508.

Even if the dots 510 and 512 do not line up with the center of the mirror 502, the physics of parallel lines apply and the alignment will be correct if the reflected images of the two dots 704 are in line with the line of sight 706. Many variations of mechanisms can be made following this principle of the invention, such as having reference points in alternative planes.

Although the present invention provides three reference points (dots 508, 510, and 512) for alignment verification, only two reference points are necessary to practice the invention. However, it may be desirable to use a third reference point to improve the precision of the alignment.

FIG. 8 shows an alternative embodiment 800, which accounts for the use of both eyes for proper adjustment of a mirror 802. If only one reference line is available, a viewer has to close one eye in order to get proper judgement of the alignment. The alternative embodiment 800 provides two side-by-side dots 804 located on a glass directly in front of the mirror 802. Proper adjustment results when the center of the mirror 802 (or a dot 806 located at the center of the mirror 802) is positioned between images 808 of the two side-by-side dots 804. Alternatively, reference points in a plane other than at the center of the mirror 802 may be used.

FIG. 9 is a top view of a mirror assembly 900 of the present invention. The mirror assembly 900 consists of a mirror 902, a fixed inner glass 904, and a fixed outer glass 906. A front transparent casing 908 and a back casing 910, together, encompasses the mirror 902 and fixed glasses 904 and 906. Because the mirror 902 is constructed on a pivotable mount 912, the mirror 902 is the only adjustable element of the assembly 900. Mirror 902 tilting is controlled using existing commercially available mechanisms.

FIG. 10 is a top view of an alternative mirror assembly 1000, which utilizes a light source 1002 located behind a mirror 1004. The mirror 1004 includes a back reflector 1006 and a translucent window 1008. A gradient pattern of coating material disposed on a back surface 1200 (FIG. 12) of the mirror 1004 forms the back reflector 1006. In the present invention, the pattern is concentric although other patterns may be used. The assembly 1000 also consists of a tilt left/right movement control 1010, a tilt back/front movement control 1012, and a screen 1014 with a hole 1016 located in the center.

FIG. 10 defines four sets of reference lines for determining proper alignment. A line passing through both the hole 1016 and a center 1020 of the mirror 1004 determines a central line of view 1018. The center 1020 stays fixed in one location and does not change with the tilt of the mirror 1004. A line from a viewer's eye to the center 1020 of the mirror 1004 forms a line of sight 1022. A line of view 1024 is defined along a path of a reflected line to the line of sight 1022. FIG. 10 also shows a line 1026 perpendicular to the mirror 1004 at the center 1020.

Proper alignment can be achieved through the use of a reflected spot 1028 and a shaded area 1030. The reflected spot 1028 is the reflection (or lack thereof) of the light 1002 filtered through the hole 1016 onto the transparent center window 1008. This reflected spot 1028 shifts positions when the mirror 1006 tilts.

FIG. 11 shows a front surface 1100 of the mirror 1004. The shaded area 1030 of FIG. 10 is a portion of the screen 1014 that is seen by a viewer through the translucent center window 1008 along the line of sight 1022. This shaded area 1030 will remain in the same position for a given line of sight 1022.

FIG. 12 shows a back surface 1200 of the mirror 1004 of FIG. 10. The back surface 1200 is coated with a gradient of coating material formed in a concentric circular pattern. Thus, when the light 1002 reflects off the back surface 1200, a concentric circular pattern appears on the screen 1014. This pattern guides the viewer in properly adjusting the mirror 1004. The coating on the surface 1200 has a hole 1202, which is aligned with the translucent center window 1008, and allows a viewer to see the screen 1014 of FIG. 10. Alternatively, the concentric circular pattern may consist of other shapes or forms and can be created through other methods.

FIG. 13 shows a front view of the screen 1014 of FIG. 10. The screen 1014 contains a curvature to reduce distortion while following the movement of the reflected spot 1028. The hole 1016 allows the light 1002 to pass through and reflect off the translucent center window 1008. The resulting reflection appears as the reflected spot 1028 on the screen 1014. Light also passes through the hole 1016 and reflects off the back reflector 1006 to form a pattern on the screen 1014. The center of the pattern is located at the reflected spot 1028.

FIG. 14 is a top illustration of the assembly of FIG. 10 defining the central line of view 1018, which is fixed in direction with respect to the center 1020 of the mirror 1004. The central line 1018 does not change with mirror 1004 tilt, and is determined by the vehicle manufacturer.

FIG. 15 is an illustration of the mirror 1004 of FIG. 10 improperly adjusted. Because the line of view 1024 does not coincide with the central line of view 1018, a target image 1500 is not visible. The viewer would know that the view is incorrect because the shaded area 1030 has a pattern that indicates the direction the mirror 1004 has to be tilted to get the target image 1500 in view, as will be discussed in more detail in connection with FIG. 16.

FIG. 16 is an illustration of the mirror 1004 properly aligned. Proper alignment is achieved when the line of view 1024 overlaps the central line of view 1018. Consequently, the reflected spot 1028 overlaps the shaded area 1030, resulting in the reflected spot 1028 centering on the target image 1500.

The viewer is assured of the correctness of the alignment due to the clear view of the reflected spot 1028. The patterns of the shaded area 1030 are designed to assist the viewer to navigate and control the direction of the tilt to achieve proper alignment by overlapping the shaded area 1030 with the reflected spot 1028. When using both eyes, the shaded area 1030 will appear elongated and adjustment is conducted by bringing the reflected spot 1028 to the middle of the shaded area 1030.

FIGS. 17–19 relate to an attachment to the outward end of the side-view mirror assembly 1700 having a right-angled reflecting element 1704, which could be a prism or a mirror, for example. Behind the right angled reflecting element 1704 is fixed a chamber 1706 with an added chamber cover 1707 attached to the mirror body 1708 having mounting cover 1709. Chamber 1706 contains an internal light 1710 and two alignment markers 1712 and 1714. Preferably, alignment markers 1712 and 1714 are translucent and rigidly fixed in place. However, markers 1712 and 1714 could also be opaque objects that reflect internal light 1710, for example. In the preferred embodiment as shown in FIG. 17, marker 1712 is a green spot and marker 1714 is a red circle. Other shapes, such as ovals, squares, rectangles, triangles or other polygons can be used for the two translucent markers 1712 and 1714. Preferably, the colors of markers 1712 and 1714 should have a high contrast to each other. The two alignment markers 1712 and 1714 are located on a line 1716 parallel to the central line 1718 of the mirror 1720 but offset as shown in FIG. 17 by the distance from the center of the mirror to the center of the prism's reflecting surface. With the internal light 1710 on, the view through the prism shows the reflected images 1724 and 1722 of the red circle 1714 and the green spot 1712 either skewed, if the mirror is (as shown in FIGS. 17 and 18) not properly aimed, or superimposed, if the mirror is (as shown in FIG. 19) properly aimed. The advantage of this concept is that an existing mirror mount and mechanism can be used without concern about interference from the aiming device or need for additional tilting mechanisms. Also, mirror adjustments can be made in ambient light during daytime as well as in the dark at night.

In the preferred embodiment, moving the reflected image of the green spot 1712 relative to red circle 1714 adjusts the mirror's aim. The viewer, after turning on the internal light 1710, tilts and turns the mirror 1720, preferably with a remote mirror adjustment mechanism, until the reflected green spot 1722 and the reflected red circle 1724 are centered and superimposed. This situation occurs when the angles $\alpha$ between the mirror 1720 and the central line 1718, and the angle $\beta$ between the mirror 1720 and the viewer's line of sight 1726, (as shown in FIG. 19) are equal. In the figures, $\alpha$ and $\beta$ are shown as the angles at the intersection of the line through the alignment markers and its reflected line 1728. The use of an internal light 1710 with the translucent markers 1712 and 1714 minimizes the impact of ambient light conditions. However, ambient light could be substituted for the internal light 1710. The mirror 1720 can also be adjusted by hand.

The right-angled reflecting element 1704 can be located elsewhere. The criteria for determining an acceptable location are that it moves with mirror 1720 and that it is easily visible by the viewer, while the alignment markers 1712 and 1714 remain stationary.

If space permits, the fixed chamber 1708 can be inside the mirror body 1706. To ensure an easy means of aligning the dots, a coarse and fine mirror adjusting mechanism can be employed. This method can also be used in case of camera scanning devices to ensure that the target is included in the field covered by the camera scan.

Although FIGS. 17–19 use the example of a side-view mirror for mirror assembly 1700, the same principles could be applied to a rear-view mirror or other optical device.

The invention has been described above with reference to specific embodiments. It will be apparent to those skilled in the art that various modifications may be made and other embodiments can be used without departing from the scope of the invention. Therefore, these and other variations upon the specific embodiments are within the scope of the present invention, which is limited only by the appended claims.

What is claimed is:

1. A method for orienting an optical device mounted on a vehicle to provide a critical field of view to a vehicle driver, said optical device having an obverse surface with a viewing surface viewed by the vehicle driver, and a reverse surface with respect to the vehicle driver, the method comprising the steps of:

identifying a target point located outside of the vehicle and on a surface proximate the vehicle such that an image of said target point is viewed at the center of said viewing surface to provide said critical field of view;

identifying a central line between said target point and said target point image at the center of the viewing surface during viewing of said critical field of view such that said central line does not change with a change in driver position;

providing an alignment assembly in fixed relation with said viewing surface, such that reorientation of said alignment assembly results in a corresponding reorientation of said viewing surface;

determining, in accordance with the vehicle shape, vehicle geometry, and location of the optical device on the vehicle, the critical locations of two objects situated on the reverse side of said optical device and having reference points at their centers, such that orientation of said alignment assembly to provide visual alignment of said two reference points viewed by the driver by means of said alignment assembly effects orientation of said optical device whereby said target point is visible to said driver in the center of said viewing surface and along said central line.

2. An alignment assembly for an optical device mounted on a vehicle comprising:

two objects with reference points at their centers, said two objects being attached to said alignment assembly at the two critical locations determined in claim 1.

3. The alignment assembly of claim 2 wherein said alignment assembly attaches to the outside of said optical device.

4. The alignment assembly of claim 2, wherein each of said two objects and said two reference points produce an image of a different graphical representation.

5. The alignment assembly of claim 2, further comprising a reflecting element positioned to reflect images of said two objects for visual alignment by said vehicle driver.

6. The alignment assembly of claim 5, wherein said reflecting element is placed at a right angle to said viewing surface, and further wherein said reflecting element is one of an internal prism face or an extension of said viewing surface.

7. The alignment assembly of claim 2, wherein visual alignment of said two reference points presents images of said two references points, one behind the other, in a field of view of said driver.

8. The alignment assembly of claim 2, wherein said optical device is a side view mirror.

9. A method for ensuring correct coverage of a total critical field of view to a vehicle operator, the method comprising the steps of:

providing an optical device which includes a first mirror;

joining, as part of said optical device, an extension of said first mirror, wherein said extension is one of a right-angled prism or a right-angled mirror;

positioning two objects behind said extension;

directing light to illuminate said two objects; and visually overlapping images of said two objects as viewed by said operator in said extension, by adjusting the orientation of the extension, and thus adjusting the orientation of said first mirror to provide said total critical field of view to said operator.

10. The method of claim 9, wherein the step of overlapping further comprises using remote movement controls to tilt said first mirror.

* * * * *